US009644049B2

(12) United States Patent
Jorgensen

(10) Patent No.: US 9,644,049 B2
(45) Date of Patent: May 9, 2017

(54) POLYMERS, METHOD OF PRODUCING THE SAME, AND ARTICLES MADE THEREFROM

(75) Inventor: Robert J. Jorgensen, Scott Depot, WV (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 433 days.

(21) Appl. No.: 13/991,541

(22) PCT Filed: Dec. 29, 2011

(86) PCT No.: PCT/US2011/067937
§ 371 (c)(1),
(2), (4) Date: Aug. 12, 2013

(87) PCT Pub. No.: WO2012/092507
PCT Pub. Date: Jul. 5, 2012

(65) Prior Publication Data
US 2013/0324681 A1 Dec. 5, 2013

Related U.S. Application Data

(60) Provisional application No. 61/428,970, filed on Dec. 31, 2010.

(51) Int. Cl.
C08F 210/16 (2006.01)
C08F 110/02 (2006.01)
C08F 10/00 (2006.01)

(52) U.S. Cl.
CPC ............ C08F 110/02 (2013.01); C08F 10/00 (2013.01); C08F 210/16 (2013.01); C08F 2410/03 (2013.01)

(58) Field of Classification Search
CPC .......... C08F 10/02; C08F 210/16; C08F 6/04; C08F 2500/12; C08F 2500/07; C08F 2500/08
See application file for complete search history.

(56) References Cited

U.S. PATENT DOCUMENTS

| 5,405,901 | A | 4/1995 | Daniell et al. |
| 5,589,539 | A | 12/1996 | Wagner et al. |
| 6,248,831 | B1 | 6/2001 | Maheshwari et al. |
| 7,714,072 | B2 | 5/2010 | Mitchie, Jr. et al. |
| 2005/0228138 | A1 | 10/2005 | Davis |
| 2013/0137827 | A1* | 5/2013 | Jorgensen ............... C08F 2/34 525/240 |

FOREIGN PATENT DOCUMENTS

| EP | 1 153 943 | A1 * | 11/2001 | ............ C08F 10/00 |
| EP | 1153943 | | 11/2001 | |
| WO | WO2005052010 | | 6/2005 | |
| WO | WO2005/100414 | | 10/2005 | |
| WO | WO2009085922 | | 7/2009 | |
| WO | WO2009088701 | | 7/2009 | |
| WO | WO 2009/015107 | A2 * | 12/2009 | ............ B01J 38/04 |
| WO | WO2011126988 | | 10/2011 | |

OTHER PUBLICATIONS

Singapore Office Action dated Feb. 12, 2015 for counterpart Singapore Application No. 2013048897, 14 pages.
PCT Search Report dated May 4, 2013; from PCT counterpart Application No. PCT/US2011/067937.
IPRP dated Apr. 11, 2013; from PCT counterpart Application No. PCT/US2011/067937.
Chinese Response to Office Action dated May 8, 2015; from Chinese counterpart Application No. 201180068861.8.
Singapore Response to Office Action dated Jun. 17, 2015; from Singapore counterpart Application No. 201304889-7.
Chinese Office Action dated Dec. 25, 2014 for counterpart Chinese Application No. 201180068861.8, 3 pages.
Chinese Response to Office Action dated Dec. 17, 2015; from Chinese counterpart Application No. 201180068861.8.
Singapore Response to Office Action dated Jan. 5, 2016; from Singapore counterpart Application No. 201304889-7.
Chinese Office Action dated Mar. 30, 2016; from Chinese counterpart Application No. 201180068861.8.
Japanese Decision on Rejection Office Action dated Aug. 9, 2016; from Japanese counterpart Application No. 2013-547678.
Chinese Response to Office Action dated Jul. 14, 2016; from Chinese counterpart Application No. 201180068861.8.
Chinese 2nd Office Action dated Sep. 2, 2015; from Chinese counterpart Application No. 201180068861.8.
Japanese Office Action dated Oct. 16, 2015; from Japanese counterpart Application No. 2013-547678.

(Continued)

Primary Examiner — Rip A Lee
(74) Attorney, Agent, or Firm — Dinsmore & Shohl LLP

(57) ABSTRACT

A virgin granular polymer comprising polymer particles wherein at least 90% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1, and further wherein the virgin granular polymer has an $I_{21}$ less than or equal to 70 and/or further wherein at least 90% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001, and further wherein the virgin granular polymer has an $I_{21}$ less than or equal to 70 is provided.

12 Claims, No Drawings

(56) References Cited

OTHER PUBLICATIONS

EP Office Action dated Oct. 6, 2015; from EP counterpart Application No. 11813750.4.
Singapore Office Action dated Aug. 5, 2015; from Singapore counterpart Application No. 201304889-7.
Chinese Office Action received Nov. 18, 2016; from Chinese counterpart Application No. 201180068861.8.

* cited by examiner

POLYMERS, METHOD OF PRODUCING THE SAME, AND ARTICLES MADE THEREFROM

FIELD OF THE INVENTION

The invention relates to polymers, method of producing the polymer and articles made therefrom. More particularly, the invention relates to polymers having a narrow composition distribution across particle size and providing low gels and good visual appearance when used to make articles.

BACKGROUND OF THE INVENTION

Fluidized bed and slurry polymerization systems, particularly staged reactor systems, can suffer from significant variation in the polymer properties of varying particle size fractions. Large variations in polymer properties across particle size can lead to difficulty in mixing the different particles during, for example, pelletization. If all of the granular particles are of similar properties, mixing will occur readily. However, if one or more fractions of particles are of substantially different molecular weight or density, melting during a pelleting operation will not be uniform. Nonuniform pelletization can, in turn, result in:
 1. "unmelts"—pellets that still have some areas of relatively undispersed granular which may cause gels or imperfections in finished articles;
 2. very high gel count pellets which can occur when granular particles are of significantly different viscosity when melted, i.e. a large molecular weight variation across particles, leading to very high gel counts in thin sheets or films; and
 3. an inability to use the resin in granular form as exiting from the final reactor due to substantial differences in molecular weight or density that prevent direct granule users, such as rotational molders, or fabricating extruders, such as blow molders, from utilizing the product due to poor mixing and high gel counts.

Such variation in polymer properties across particle size fractions occur more significantly when dual or linked reactors are used in the polymerization process, giving an even greater potential for formation of polymer granules with widely divergent properties. For example, if the polymer exiting the first reactor substantially differs in polymer properties across the particle size range, this disparity will continue and be further exacerbated in the second reactor.

To address this situation, the current approach is to employ very small catalyst particles which will produce very small polymer particles. Once used in applications, these very small polymer particles do not appear as a gel even with broad compositional distributions.

A catalyst system useful across a broad range of catalyst particle size and which produces polymers that may be compounded to produce very low gel counts would be very desirable.

SUMMARY OF THE INVENTION

The instant invention is a polymer, a method of producing the polymer and articles made from the polymer.

In one embodiment, the instant invention provides a virgin granular polymer comprising polymer particles wherein at least 90% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1, and further wherein the virgin granular polymer has an $I_{21}$ less than or equal to 70.

In another embodiment, the instant invention provides a virgin granular polymer comprising polymer particles wherein at least 90% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001, and further wherein the virgin granular polymer has an $I_{21}$ less than or equal to 70.

In another embodiment, the invention provides a reaction product of polymerizing at least one olefin monomer in the presence of: (A) at least one catalyst precursor produced by contacting a Group 4 metal compound with one or more Titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, forming said catalyst precursor solution into solid particles and subsequently halogenating the solid particles; and (B) at least one co-catalyst; wherein the reaction product comprises a granular polymer comprised of polymer particles and further wherein at least 90% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1.

In another embodiment, the instant invention provides a reaction product of polymerizing at least one monomer, in the gas phase, in the presence of: (A) at least one catalyst precursor produced by contacting a Group 4 metal compound with one or more Titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, forming said catalyst precursor solution into solid particles and subsequently halogenating the solid particles; and (B) at least one co-catalyst; wherein the reaction product comprises a granular polymer comprised of polymer particles and further wherein at least 90% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001.

In an alternative embodiment, the instant invention provides a virgin granular polymer and reaction product, in accordance with any of the preceding embodiments, except that at least 95% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1.

In an alternative embodiment, the instant invention provides a virgin granular polymer and reaction product, in accordance with any of the preceding embodiments, except that at least 93% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1.

In an alternative embodiment, the instant invention provides a virgin granular polymer and reaction product, in accordance with any of the preceding embodiments, except that at least 95% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001.

In an alternative embodiment, the instant invention provides a virgin granular polymer and reaction product, in accordance with any of the preceding embodiments, except that at least 93% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1.

In an alternative embodiment, the instant invention provides a virgin granular polymer and reaction product, in accordance with any of the preceding embodiments, except that the granular polymer is produced in a two stage linked reactor system.

In an alternative embodiment, the instant invention provides a virgin granular polymer and reaction product, in accordance with any of the preceding embodiments, except that the granular polymer is produced in a one stage reactor system.

In an alternative embodiment, the instant invention provides a virgin granular polymer and reaction product, in accordance with any of the preceding embodiments, except that the granular polymer is produced in a fluidized bed reactor system.

In an alternative embodiment, the instant invention provides a virgin granular polymer and reaction product, in accordance with any of the preceding embodiments, except that the granular polymer is produced in a slurry reactor system.

In an alternative embodiment, the instant invention provides a virgin granular polymer consisting essentially of polymer particles wherein at least 90% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1, and further wherein the virgin granular polymer has an $I_{21}$ less than or equal to 70.

In another embodiment, the instant invention provides a virgin granular polymer consisting essentially of polymer particles wherein at least 90% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001, and further wherein the virgin granular polymer has an $I_{21}$ less than or equal to 70.

DETAILED DESCRIPTION OF THE INVENTION

The terms "catalyst" and "catalyst composition" as used herein, refer to transition metal compounds, or mixtures thereof, that are useful in catalyzing the polymerization of addition polymerizable monomers, generally in combination with one or more cocatalysts or activator compounds. Preferred catalysts are mixtures or complexes of non-metallocene transition metal compounds and magnesium compounds, such as magnesium chloride compounds, alternatively referred to as Ziegler Natta catalysts or Ziegler Natta type catalysts.

The term "procatalyst" as used herein means a catalyst composition ready to be injected or fed into a polymerization reactor and that is activated to an active polymerization catalyst within the polymerization reactor by an additional component, a cocatalyst, such as an aluminum alkyl cocatalyst.

The terms "precursor" and "catalyst precursor" as used herein mean a portion of the catalyst composition containing the transition metals that is subjected to an additional reaction step to convert it into a procatalyst.

The term "virgin granular polymer" means a granular polyolefin polymer exiting a polymerization reactor with no further processing, such as grinding, pelletizing, extruding or the like.

The term "granular polymer" means a polymer produced in a fluidized bed or slurry polymerization reactor and which exits the reactor in a granular or particle form.

The term "mean" means an unweighted average.

The instant invention is a virgin granular polymer, a reaction product, articles made therefrom, and methods for making such articles.

The polymer according to a first aspect of the present invention is a virgin granular polymer comprising polymer particles wherein at least 90% by weight of the granular polymer particles have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1, and further wherein the virgin granular polymer has an $I_{21}$ less than or equal to 30. All individual values and subranges from greater than 90% by weight are included herein and disclosed herein; for example, the weight percent of the granular polymer particles having the ascribed characteristics may be from a lower limit of 90, 91, 92, 93, or 94 weight percent to an upper limit of 91, 92, 93, 94, 95, 96, 97, 98, 99 or 100 weight percent, based on the total weight of the virgin granular polymer. For example, the weight percent of the granular polymer particles having the ascribed characteristics may be in the range of from 90 to 95 weight percent, or in the alternative from 91 to 98 weight percent, or in the alternative, from 95 to 99 weight percent, or in the alternative from 93 to 99 weight percent, or in the alternative, from 94 to 97 weight percent, based on the total weight of the virgin granular polymer.

Further, the at least 90% by weight of the granular polymer particles have an $I_{21}$ wherein the ratio of the standard deviation of $I_{21}$ to the mean of the $I_{21}$ of the granular polymer is less than 0.2. All individual values from less than 0.2 are included herein and disclosed herein; for example, the ratio of the standard deviation of $I_{21}$ to the mean of the $I_{21}$ of the granular polymer may be from an upper limit of 0.02. 0.04, 0.06, 0.08, 0.1, 0.13, 0.15, 0.17, 0.19 or 0.2.

Further, the at least 90% by weight of the granular polymer particles have an $I_{21}$ and the ratio of the standard error of a linear fit to the mean of the granular polymer is less than 0.1. All individual values from less than 0.1 are included herein and disclosed herein; for example, the ratio of the standard error of a linear fit to the mean of the granular polymer may be from an upper limit of 0.02, 0.04, 0.06, 0.08, or 0.1.

Further, the at least 90% by weight of the granular polymer particles have an $I_{21}$ less than or equal to 70. All individual values of less than or equal to 70 are included herein and disclosed herein; for example, $I_{21}$ may be less than or equal to 70, or in the alternative less than or equal to 50, or in the alternative less than or equal to 40, or in the alternative less than or equal to 30, or in the alternative less than or equal to 20, or in the alternative less than or equal to 10, or in the alternative less than or equal to 8, or in the alternative less than or equal to 4.

In one embodiment, the virgin granular polymer is a polyethylene.

In a further embodiment, the virgin granular polymer is a polyethylene produced in a gas phase or slurry polymerization process.

The polymer according to a second aspect of the present invention is a virgin granular polymer comprising polymer particles wherein at least 90% by weight of the granular polymer particles a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001, and further wherein the virgin granular polymer has an $I_{21}$ less than or equal to 70. All individual values and subranges from greater than 90% by weight are included herein and disclosed herein; for example, the weight percent of the granular polymer particles having the ascribed characteristics may be from a lower limit of 90, 91, 92, 93, or 94 weight percent to an upper limit of 91, 92, 93, 94, 95, 96, 97, 98, 99 or 100 weight percent, based on the total weight of the virgin granular polymer. For example, the weight percent of the granular polymer particles having the ascribed characteristics may be in the range of from 90 to 95 weight percent, or in the alternative from 91 to 98 weight percent, or in the alternative, from 95 to 99 weight percent, or in the alternative from 93 to 99 weight percent, or in the alternative, from 94 to 97 weight percent, based on the total weight of the virgin granular polymer.

Further, the at least 90% by weight of the granular polymer particles have a density wherein the ratio of the standard deviation of the mean density of the granular polymer to the mean density of the granular polymer is less than 0.002. All individual values from less than 0.002 are included herein and disclosed herein; for example, the ratio of the standard deviation of the mean density of the granular polymer to the mean density of the granular polymer may be from an upper limit of 0.0002. 0.0004, 0.0006, 0.0008, 0.001, 0.0013, 0.0015, 0.0017, 0.0019 or 0.002.

Further, the at least 90% by weight of the granular polymer particles have a density and the ratio of the standard error of a linear fit to the mean of the density is less than 0.001. All individual values from less than 0.001 are included herein and disclosed herein; for example, the ratio of the standard error of a linear fit to the mean of the density may be from an upper limit of 0.0002, 0.0004, 0.0006, 0.0008, or 0.001.

Further, the at least 90% by weight of the granular polymer particles have an $I_{21}$ less than or equal to 70. All individual values of less than or equal to 70 are included herein and disclosed herein; for example, $I_{21}$ may be less than or equal to 70, or in the alternative less than or equal to 60, or in the alternative less than or equal to 50, or in the alternative less than or equal to 40, or in the alternative less than or equal to 30, or in the alternative less than or equal to 10, or in the alternative less than or equal to 8, or in the alternative less than or equal to 4.

The polymer according to a third aspect of the present invention is a reaction product of polymerizing at least one olefin monomer in the presence of: (A) at least one catalyst precursor produced by contacting a Group 4 metal compound with one or more Titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, forming said catalyst precursor solution into solid particles and subsequently halogenating the solid particles; and (B) at least one co-catalyst; wherein the reaction product comprises a granular polymer comprised of polymer particles and further wherein at least 90% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1. All individual values and subranges from greater than 90% by weight of the granular polymer particles are included herein and disclosed herein; for example, the weight percent of the granular polymer particles having the ascribed characteristics may be from a lower limit of 90, 91, 92, 93, or 94 weight percent to an upper limit of 91, 92, 93, 94, 95, 96, 97, 98, 99 or 100 weight percent, based on the total weight of the granular polymer. For example, the weight percent of the granular polymer particles having the ascribed characteristics may be in the range of from 90 to 95 weight percent, or in the alternative from 91 to 98 weight percent, or in the alternative, from 95 to 99 weight percent, or in the alternative from 93 to 99 weight percent, or in the alternative, from 94 to 97 weight percent, based on the total weight of the granular polymer.

The polymer according to a fourth aspect of the present invention is a reaction product of polymerizing at least one monomer, in the gas phase, in the presence of: (A) at least one catalyst precursor produced by contacting a Group 4 metal compound with one or more Titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, forming said catalyst precursor solution into solid particles and subsequently halogenating the solid particles; and (B) at least one co-catalyst; wherein the reaction product comprises a granular polymer comprised of polymer particles and further wherein at least 90% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001. All individual values and subranges from greater than 90% by weight of the granular polymer particles are included herein and disclosed herein; for example, the weight percent of the granular polymer particles having the ascribed characteristics may be from a lower limit of 90, 91, 92, 93, or 94 weight percent to an upper limit of 91, 92, 93, 94, 95, 96, 97, 98, 99 or 100 weight percent, based on the total weight of the granular polymer. For example, the weight percent of the granular polymer particles having the ascribed characteristics may be in the range of from 90 to 95 weight percent, or in the alternative from 91 to 98 weight percent, or in the alternative, from 95 to 99 weight percent, or in the alternative from 93 to 99 weight percent, or in the alternative, from 94 to 97 weight percent, based on the total weight of the granular polymer.

In one embodiment, the inventive virgin granular polymer is a combination of two or more of the embodiments described herein.

In one embodiment, the reaction product is a combination f tow or more of the embodiments described herein.

Catalyst precursors useful in the invention include those with no internal electron donors. The catalyst precursors may comprise substantially spheroidal shaped particles of a magnesium halide containing precursor, the particles having an average size (D50) of from 10 to 70 microns, from 15 to 50 microns, or from 20 to 35 microns, having been produced via spray drying from a nominally neutral acidity feedstock. The catalyst precursor may be produced by: a) providing a liquid composition comprising i) a magnesium halide compound or magnesium compound that is convertible to magnesium halide via halogenation, ii) an alcoholic solvent or diluent, iii) at least two transition metal compounds wherein the transition metals are selected from the metals of Groups 3-10 and of the Periodic Table of the Elements and wherein one of the metals is Titanium and the other metal is Zirconium or Hafnium or both, iv) optionally a filler wherein the acidity of the liquid composition is adjusted to essentially neutral by adjusting the composition of either the Titanium compound or the magnesium compound that is convertible to magnesium chloride; b) spray-drying the composition in a closed cycle spray drier to form a spray-dried particle; and c) collecting the resulting solid particles which are a precursor powder. Representative magnesium compounds that convert to $MgCl_2$ in the presence of the alcohol solution include magnesium alkoxides and magnesium alkyl carbonates.

The spray-dried procatalyst particles may be combined with a cocatalyst to form an active catalyst composition. The activation may occur prior to or simultaneously with, or after contacting with the monomer or monomers to be polymerized. In some embodiments of the present invention, the procatalyst is partially or fully activated outside the polymerization reactor by contacting the procatalyst with a portion of the cocatalyst in an inert liquid hydrocarbon as disclosed in U.S. Pat. Nos. 6,187,866 and 6,617,405, the disclosures of which are incorporated herein by reference. After contacting the procatalyst composition with the cocatalyst, the hydrocarbon solvent may be removed by drying or, preferably, the catalyst composition may be directly fed to the polymerization reactor where the activation is completed with additional amounts of the same or a different cocatalyst.

Additional precursor, procatalysts and catalysts useful in the preparing the inventive virgin granular polymers are described in copending application U.S. application Ser. No. 12/759,515 filed on Apr. 13, 2010, the disclosure of which is incorporated herein by reference.

The virgin granular polymers of the present invention are useful in a variety of applications ranging from blow molding products to stretch tapes. The inventive virgin granular polymers are useful in direct applications such as rotomolding, blowmolding or sheet formation and are particularly amenable to the production of very high molecular weight polymers that may be very difficult to pelletize for homogeneity, i.e. polymers with high load melt indices ($I_{21}$) in the 0.1 to 3 range.

The inventive virgin granular polymers may be produced in existing fluidized bed or slurry reaction systems, and may be produced using single or multiple reactor systems. The inventive virgin granular polymers may be produced, for example, in the reactor systems disclosed in WO2008US87581 and WO2008US87378, the disclosures of which are incorporated herein by reference Variation in the inventive virgin granular polymer properties are controlled within the limits prescribed by measurement method precision. Resin Density, for example, may be precisely measured according to ASTM D792. Table 1 provides the Standard Deviation (SD) and r value of resin density measurements taken according to ASTM D792 on a test high density polyethylene.

TABLE 1

| Method | Standard Deviation (SD) of multiple tests within one laboratory | r value = 2.8 * SD |
|---|---|---|
| ASTM D792 | 0.0008 | 0.0022 |

ASTM D792 defines the repeatability or repeatability index, r, as: r=2.8·(SD). A measurement on a material has repeatability if two test results obtained within one laboratory differ by the r value or less for that material. The r value is the critical difference between two test results for the same material, obtained by the same operator using the same equipment on the same day in the same laboratory. Thus, all particle size fractions of the inventive virgin granular polymer should have a density within ±0.0022 g/cc of each other. In such instance, the virgin granular polymer can be said to an equivalent density across all polymer particle fractions.

In like manner, for $I_{21}$, $I_5$ and $I_2$ there are known levels of variation that are the result of the test itself independent of the actual normal variation that may occur in any continuous process. Again, to provide for the optimum granular resin performance, it is desired that >90% by weight and preferably >95% by weight of the granular resin has melt flow properties that are within this known level of variation in measurement.

In particular, for very high molecular weight polymers, the $I_{21}$ value is generally measured using ASTM standard 1238 D, Procedure A (cut-off). Repeatability indices are not given for $I_{21}$, only for $I_2$, however one of ordinary skill in the art would anticipate that the repeatability for $I_{21}$ would be similar to that for $I_2$. Table 2 below provides the repeatability, r, (i.e., precision) indices for $I_2$ as specified in ASTM 1238D, Procedure A, wherein Standard Deviation=SD.

TABLE 2

| Material/Condition | Mean $I_2$ (g/10 min) | SD between Labs | Repeatability = 2.83 * SD | % of Value* | Low $I_2$ (g/10 min) Value | High $I_2$ (g/10 min) Value |
|---|---|---|---|---|---|---|
| Polyethylene 190/2.16 | 0.27 | 0.022 | 0.062 | 23.1 | 0.208 | 0.332 |
| Polyethylene 190/2.16 | 0.4 | 0.038 | 0.108 | 26.9 | 0.292 | 0.508 |
| Polyethylene 190/2.16 | 2.04 | 0.079 | 0.224 | 11.0 | 1.816 | 2.264 |

*Calculated as r value divided by average $I_2$ multiplied by 100.

Because the actual measured quantity, (grams/10 minutes (g/10 min)) flowing through a die of a prescribed size at a prescribed temperature is not fully representative of the actual molecular weight of the polymer, the natural logarithm ("ln" herein) of the $I_{21}$, $I_5$ or $I_2$ is used as this is a better predictor of actual molecular weight of the polymer. In general, the change in $\ln(I_{21})$ is representative of the change in number average molecular weight whereas the change in $\ln(I_2)$ is representative of the change in weight average molecular weight.

EXAMPLES

The following examples illustrate the present invention but are not intended to limit the scope of the invention.

Inventive Examples

Precursor and Procatalyst Preparation

The catalyst precursor solution used in each of the polymerization process, Inventive Examples 1-4 below, was prepared as follows:

Under inert reaction conditions, the components shown in Table 3 were charged to a solution preparation vessel.

TABLE 3

| Feedstock Charge | |
|---|---|
| Ethanol, kg | 1000 |
| MgCl$_2$, kg | 50.34 |
| TiCl$_3$ AA, kg | 20.34 |
| HfCl$_4$, kg | 33.64 |
| CAB-O-SIL ™ TS-610, kg | 70.00 |

The ethanol was charged first followed by MgCl$_2$, HfCl$_4$ and TiCl$_3$ (AA). Amounts listed were aim values, some slight losses occurred although the amounts given in Table 1 are all within 5% by weight of the amount actually added. The ethanol used was specially denatured ethanol from Brüggemann Chemical U.S., Inc. (Newtown Square, Pa.) containing about 0.5% by weight of toluene and <100 ppm water. Magnesium chloride was obtained from SRC, Inc. (Cleveland, Ohio), Hafnium Tetrachloride (containing up to 1 wt % Zirconium) from ATI Wah-Chang (Albany, Oreg.) and aluminum activated titanium trichloride from W.R. Grace & Co. CAB-O-SIL™ TS-610 (which is a filler) was obtained from the Cabot Corporation.

The mixture was stirred at 35 to 50° C. under a nitrogen blanket for about 8 hours prior to the start of spray drying. The spray drying process produced a catalyst precursor powder. A 2.5 meter Gea Niro Rotary Atomizer Type FS-15 atomizer wheel (available from Gea Niro, Søborg, Denmark) was used. Atomizer speed was adjusted to obtain an average particle size of the catalyst precursor of about 30 microns. Inlet temperature was adjusted to achieve an outlet temperature between 105 and 110° C. and the feedstock was spray dried at a rate of 100 to 150 kg/hr.

Particle size distribution in the catalyst precursor powder was determined using a Malvern Mastersizer 2000 particle size analyzer with heptane as the dispersant. The General Purpose (Spherical) particle model was used to calculate particle size. Sonication was utilized (50% power, 30 to 60 seconds) to break up any agglomerates that might have formed in the sampling process. Table 4 lists the particle size distribution of the catalyst precursor powder by percent by volume.

TABLE 4

| Particle Size, Microns | Volume % |
|---|---|
| 0.55 | 0.07 |
| 0.63 | 0.1 |
| 0.724 | 0.12 |
| 0.832 | 0.15 |
| 0.955 | 0.18 |
| 1.096 | 0.21 |
| 1.259 | 0.23 |
| 1.445 | 0.24 |
| 1.66 | 0.22 |
| 1.905 | 0.21 |
| 2.188 | 0.23 |
| 2.512 | 0.3 |
| 2.884 | 0.45 |
| 3.311 | 0.7 |
| 3.802 | 1.05 |
| 4.365 | 1.49 |
| 5.012 | 1.95 |
| 5.754 | 2.4 |
| 6.607 | 2.76 |
| 7.586 | 2.99 |
| 8.71 | 3.07 |
| 10 | 3.02 |
| 11.482 | 2.91 |
| 22.909 | 4.63 |
| 26.203 | 5.58 |
| 30.2 | 6.52 |
| 34.674 | 7.26 |
| 39.811 | 7.64 |
| 45.709 | 7.52 |
| 52.481 | 6.88 |
| 60.256 | 5.8 |
| 69.183 | 4.45 |
| 79.433 | 3.03 |
| 91.201 | 1.75 |
| 104.713 | 0.73 |
| 120.226 | 0.11 |

The catalyst precursor powder was then dispersed in isopentane to form a catalyst precursor powder solution. The halogenation agent, ethylaluminum sesquichloride (EASC), was then added to the catalyst precursor powder solution at a 2.0 "Cl to ethoxide" molar ratio to form a procatalyst slurry. Ethoxide as used herein means free ethanol remaining in the spray dried catalyst precursor and ethoxide ligands present, for example, on the Hf, Ti and/or Zr components. Ethoxide content is measured as ethanol after the catalyst precursor is contacted with acidified water (i.e., HCl added to obtain a pH of about 1). A sample of the liquid phase was then injected into a gas chromatograph and ethanol content determined. The precursor prior to halogenation had an average ethoxide content of about 25 wt % (ranging from 24 to 27 wt % in a number of measurements).

The precursor slurry was then mixed at 50° C. for one hour, and the solids then allowed to settle. The supernatant liquid was decanted, an additional volume of isopentane was added, and this washing step was repeated two additional times.

HYDROBRITE 380 mineral oil (available from Sonneborn, LLC, Mahwah, N.J.) was then added to the solids remaining following the washing process to produce a slurry of procatalyst. Vacuum was drawn on the procatalyst slurry for approximately one hour to evaporate any isopentane remaining following the washing process.

The catalyst precursor for use in the polymerization process, Inventive Example 5 below, was prepared in the same manner as that described above for preparation of the precursor for use in Inventive Examples 1-4 with the following exceptions: Feedstock: Titanium tetraisopropylate was used at the same molar ratio to Magnesium and Hafnium instead of the Titanium Trichloride.

Spray Drying: The spray dryer was a Gea Niro MOBILE MINOR spray dryer (available from Gea Niro, Søborg, Denmark) using the vaned atomizer wheel. Atomizer speed was adjusted to obtain particles having a D50 of about 25 microns and was approximately 34,000 RPM.

Feedrate: Feedrate was adjusted to maintain a 105 to 110° C. outlet temperature. Average feed rate was ~100 grams/hour.

Particle size distribution: A narrower particle size distribution was obtained. Particle Size was measured using an LA-950 particle size analyzer (which utilizes software containing both ISO 13320 and USP 429 calculation) available from Horiba Ltd with heptane as the diluent.

Table 5 provides the particle size distribution by volume percent for the catalyst precursor powder for Inventive Example 5.

TABLE 5

| Size Microns | Volume % |
|---|---|
| 4.472 | 0 |
| 5.122 | 0 |
| 5.867 | 0.124 |
| 6.72 | 0.22 |
| 7.697 | 0.386 |
| 8.816 | 0.665 |
| 10.097 | 1.118 |
| 11.565 | 1.854 |
| 13.246 | 2.977 |
| 15.172 | 4.578 |
| 17.377 | 6.655 |
| 19.904 | 9.007 |
| 22.797 | 11.169 |
| 26.111 | 12.478 |
| 29.907 | 12.378 |
| 34.255 | 10.821 |
| 39.234 | 8.355 |
| 44.938 | 5.855 |
| 51.471 | 3.91 |
| 58.953 | 2.547 |
| 67.523 | 1.648 |
| 77.339 | 1.03 |
| 88.583 | 0.642 |
| 101.46 | 0.412 |
| 116.21 | 0.274 |
| 133.1 | 0.2 |
| 152.45 | 0.159 |
| 174.6 | 0.136 |
| 200 | 0.126 |
| 229 | 0.131 |
| 262.4 | 0.144 |

The catalyst precursor ethoxide content was about 25 wt %. The catalyst precursor for Inventive Example 5 was converted into a procatalyst using the same procedure as that used to prepare the procatalysts used for Inventive Examples 1-4.

Polymerization Processes and Polymers

Inventive Examples 1-5

For Inventive Example 1 the polymerization reaction was effected in the first reactor of the dual reactor system as described in WO2008US87581 and WO2008US87378, the disclosures of which are incorporated herein by reference. That is, the product of the first reactor was not further subjected to polymerization in a second reactor. Table 6 below provides the reactor conditions and the properties of the polymer produced for Inventive Example 1.

TABLE 6

| REACTOR CONDITIONS | |
|---|---|
| Temperature, ° C. | 82.0 |
| $H_2/C_2$ ratio | 0.1416 |
| $C_6/C_2$ ratio | 0.0131 |
| $C_2$ partial pressure, PSIG | 55.0 |
| Calculated Production Rate, lbs/hr | 36.4 |
| Bed Weight, lbs | 82.4 |
| Static Volts 90 min average | 23.0 |
| Static Range 90 average | 77.3 |
| Cocatalyst type | Triethylaluminum (TEAL) |
| Continuity Additive (CA), ppm in bed | 10 |
| Isopentane, mole % | 18.5 |
| delta dew point | 5.6 |
| Residence Time, hours | 2.27 |
| POLYMER PROPERTIES | |
| $I_{21}$, dg/min | 1.120 |
| Density, g/cc | 0.9377 |
| Average Particle Size, inch | 0.029 |
| Bulk Density, lb/ft$^3$ | 25.900 |
| Ti ppmw | 3.95 |
| Al ppmw | 28.92 |

A representative sample of the bulk polymer was fractionated using a standard geometric sieve set (10/18/35/60/120/200—followed by pan) with openings in the sieve set of 2000/1000/500/250/125/70 microns, respectively. The residual aluminum content in the fractions was determined via X-Ray Fluorescence (XRF) using appropriate standards. The residual aluminum content was essentially constant across all polymer particle sizes, as detailed in Table 7 below, which provides the analysis for two separate samples of Inventive Example 1.

TABLE 7

| Polymer Particle Size (micron) | Sample 1 of Inventive Example 1, Wt % | Average Al by XRF, Sample 1 | Sample 2 of Inventive Example 1, Wt % | Average Al by XRF, Sample 2 |
|---|---|---|---|---|
| Example 1 | | | | |
| 2000 | 3.6287 | 29 | 30 | 29.5 |
| 1000 | 36.6802 | 28 | 27 | 27.5 |
| 500 | 28.4707 | 25 | 26 | 25.5 |
| 250 | 18.7506 | 29 | 30 | 29.5 |
| 125 | 8.4994 | 35 | 35 | 35 |
| 70 | 2.2401 | | | |
| less than 70 | 1.7396 | | | |
| Blended Sample | | 31 | 32 | 31.5 |

For Inventive Example 2, the polymerization was performed in linked reactors to produce a very broad molecular weight distribution polymer. Table 8 below provides the reactor conditions and the properties of the polymer produced for Inventive Example 2. The first reactor product was fractionated as described above in connection with Inventive Example 1, and the results are given in Table 9.

TABLE 8

| REACTOR PROPERTIES | |
|---|---|
| Temperature, °C. | 82.0 |
| $H_2/C_2$ ratio | 0.1000 |
| $C_6/C_2$ ratio | 0.0181 |
| $C_2$ partial pressure, PSIG | 42.4 |
| Calculated Production Rate, lbs/hr | 30.0 |
| Bed Weight, lbs | 150.5 |
| Static Volts 90 min average | −63.2 |
| Static Range 90 average | 317.3 |
| Cocatalyst type | TEAL |
| Continuity Additive, ppm in bed | 12 |
| Isopentane, mol % | 18.1 |
| delta dew point | 7.0 |
| Residence Time, hours | 5.02 |
| POLYMER PROPERTIES | |
| Al, ppmw | 42.39 |
| $I_{21}$, dg/min | 0.937 |
| Density, g/cc | 0.9353 |
| Average Particle Size, inch | 0.035 |
| Bulk Density, lb/ft$^3$ | 24.100 |
| Ti, ppmw | 3.89 |

TABLE 9

| Particle Size (micron) | wt % on Screen | Density (g/cc)* | Density Delta | ln $I_{21}$ | $I_{21}$ (dg/min)* | Al (ppm)** | Al Variation*** |
|---|---|---|---|---|---|---|---|
| Inventive Example 2 | Bulk | 0.9351 | | −0.07 | 0.937 | 66.5 | |
| 2000 | 3.83 | 0.9352 | −0.0001 | 0.28 | 1.321 | 72.5 | 0.090226 |
| 1000 | 25.28 | 0.9340 | 0.0011 | 0.00 | 1.000 | 61 | −0.08271 |
| 500 | 26.92 | 0.9338 | 0.0013 | 0.00 | 1.002 | 82 | 0.233083 |
| 250 | 22.77 | 0.9355 | −0.0004 | −0.13 | 0.880 | 65 | −0.02256 |
| 125 | 15.73 | 0.9368 | −0.0017 | −0.30 | 0.738 | 60.5 | −0.09023 |
| 70 | 3.68 | nd**** | | | nd | nd | |
| less than 70 | 1.79 | Nd | | | nd | nd | |

*Extruded or Pellets
**Average of two measurements
***(measured average)/average
****"nd" means not detected.

The density and $I_{21}$ values were all within the repeatability limits of the method or the standard deviation of the mean.

For Inventive Example 3, the polymerization was conducted in a dual reactor system as described in WO2008US87581 and WO2008US87378. Table 10 below provides the reactor conditions for both the first and second reactors for Inventive Example 3. Table 11 lists the properties of the polymer produced in the first reactor. Table 12 lists the properties of the polymer produced in the second reactor. The second reactor polymer product was fractionated as described above in connection with Inventive Example 1, and the results are given in Table 13.

TABLE 10

| 1ST REACTOR CONDITIONS | | 2ND REACTOR CONDITIONS | |
|---|---|---|---|
| Temperature, °C. | 82.0 | Temperature, °C. | 110.0 |
| $H_2/C_2$ ratio | 0.1187 | $H_2/C_2$ ratio | 0.601 |
| $C_6/C_2$ ratio | 0.0065 | $C_6/C_2$ ratio | 0.0004 |
| $C_2$ partial pressure, PSIG | 70.7 | $C_2$ partial pressure, PSIG | 93.3 |
| Calculated Production Rate, lbs/hr | 33.6 | Calculated Production Rate, lbs/hr | 21.5 |
| Inlet Dew Point, °C. | 68.6 | Split by Ti Analysis | 0.688 |
| Bed Weight, lbs | 78.5 | Energy Balance Rate lb/hr | 21.3 |
| Cocatalyst type | TEAL | Energy Balance Rate | 55.1 |
| Continuity Additive, ppm in bed | 10.5 | Mass Balance Hourly rate | 52.2 |
| Isopentane mol % | 18.1 | Bed Weight, lbs | 129.5 |
| Residence Time, hours | 2.34 | Residence Time, hours | 2.35 |

TABLE 11

| FIRST REACTOR POLYMER PROPERTIES | |
|---|---|
| $I_{21}$, dg/min | 0.648 |
| Density, g/cc | 0.9409 |
| Average Particle Size, inch | 0.043 |
| Fines, wt % | 1.630 |
| Bulk Density, lb/ft$^3$ | 25.100 |
| Residual Ti, ppmw | 2.11 |
| Residual Al, ppmw | 23.32 |

TABLE 12

SECOND REACTOR POLYMER PROPERTIES

| | |
|---|---|
| $I_{21}/I_2$ | 85.76923 |
| $I_2$, dg/min | 0.0793 |
| $I_{21}$, dg/min | 6.8056 |
| $I_5$, dg/min | 0.3601 |
| $I_{21}/I_5$ | 18.9 |
| Density, g/cc | 0.9534 |
| Bulk Density, $lb/ft^3$ | 28.4005 |
| Average Particle Size, inch | 0.0436 |
| Fines, wt % | 1.6694 |
| Residual Al, ppmw | 21.9733 |
| Residual Ti, ppmw | 1.4496 |
| Al/Ti ratio | 26.91 |

TABLE 13

| Particle Size (micron) | wt % | Density (g/cc) | Density Delta | Absolute Value Difference | ln $I_2$ | $I_2$, dg/min | ln ($I_5$) | $I_5$, dg/min |
|---|---|---|---|---|---|---|---|---|
| Inventive Example 3 | Bulk | 0.9538 | | | −2.50 | 0.082 | −1.02 | 0.36 |
| 2000 | 8.77 | 0.9521 | 0.0017 | 0.0017 | −2.32 | 0.099 | −0.86 | 0.42 |
| 1000 | 36.88 | 0.9537 | .0001 | .0001 | −2.58 | 0.076 | −1.03 | 0.36 |
| 500 | 25.51 | 0.9541 | −0.0003 | 0.0003 | −2.33 | 0.098 | −0.87 | 0.42 |
| 250 | 19.56 | 0.9551 | −0.0013 | 0.0013 | −2.26 | 0.104 | −0.78 | 0.46 |
| 125 | 8.17 | 0.9541 | −0.0003 | 0.0003 | −2.42 | 0.089 | −0.97 | 0.38 |

| Particle Size (micron) | wt % | ln ($I_{21}$) | $I_{21}$, dg/min | Al ppm |
|---|---|---|---|---|
| Example 3 | Whole | 1.95 | 7.01 | 20.5 |
| 2000 | 8.77 | 2.05 | 7.79 | 26 |
| 1000 | 36.88 | 1.91 | 6.74 | 23 |
| 500 | 25.51 | 2.10 | 8.18 | 22.5 |
| 250 | 19.56 | 2.09 | 8.12 | 21.5 |
| 125 | 8.17 | 1.95 | 7.02 | 21.5 |
| 70 | 0.50 | nd | | |
| less than 70 | 0.61 | nd | | |

Samples of the polymer of Inventive Example 3 were converted into pellets in a KOBE™ LCM-100 twin screw extruder and then converted into inflation films, as is generally known in the art. More specifically, the inflation film is formed by extruding the polymer resin at a temperature within the range of from 180 to 220° C., for example, and subsequently causing the extruded sheet, by means of a proper form of air, to be simultaneously cooled and inflated to a prescribed size. The film appearance rating was good indicating the substantial absence of gels.

For Inventive Example 4, the polymerization was conducted as described for Inventive Example 1 except that the conditions of the sole reactor were at the values set out in Table 14. The polymer product was fractionated as described above in connection with Inventive Example 1, and the results are given in Table 15.

TABLE 14

| | |
|---|---|
| Temperature, ° C. | 82.00 |
| $C_2$ partial pressure, PSIG | 71.8918 |
| $C_6/C_2$ ratio | 0.0145 |
| $H_2/C_2$ ratio | 0.1050 |
| Residence Time, hours | ~3.5 |
| Isopentane, mol % | 16.61 |
| Bulk Density, $lb/ft^3$ | 22.80 |
| Average Particle Size, inch | 0.047 |

TABLE 15

| Particle Size Microns | Wt % | Density (g/cc) | Density Delta | ln ($I_{21}$) | $I_{21}$, dg/min |
|---|---|---|---|---|---|
| Bulk Sample | | 0.9369 | | −0.29 | 0.751 |
| 2000 | 9.330 | 0.9357 | 0.0012 | −0.02 | 0.983 |
| 1000 | 50.110 | 0.9366 | 0.0003 | −0.14 | 0.867 |
| 500 | 24.250 | 0.9366 | 0.0003 | −0.10 | 0.906 |
| 250 | 11.660 | 0.937 | −0.0001 | −0.17 | 0.846 |
| 125 | 4.030 | 0.9375 | −0.0006 | −0.33 | 0.722 |
| 70 | 0.450 | nd | | | nd |
| less than 70 | 0.170 | nd | | | nd |

As can be seen in Table 15, greater than 95% of the resin particles have the same physical properties.

Comparative Example 1

Catalyst Precursor and Procatalyst Preparation, Polymerization and Polymer

Comparative Example Procatalyst 1 was prepared following the examples of U.S. Pat. No. 6,187,866, except as expressly described. The disclosure of U.S. Pat. No. 6,187,866 is incorporated herein by reference. A feedstock primarily containing anhydrous tetrahydrofuran (THF), dried to less than about 50 ppm water, was heated to approximately 50° C. Granular magnesium metal (100 to about 4000 micron in particle size) was then added to the THF followed by addition of titanium tetrachloride. The mixture was then heated to approximately 70° C. Without being bound by any particular theory, it is currently believed that the Mg metal chemically reduces the titanium tetrachloride to lower valence states, primarily to the +3 valence state. An Mg/Ti molar ratio of slightly higher than 0.5 was used to assure essentially complete reduction of the $Ti^{+4}$ to lower valence states. Magnesium dichloride was then added to bring the total molar ratio of Magnesium to Titanium in the mixture to between 5.5:1 and 6:1. This mixture was then heated and mixed further for approximately 4 to 6 hours followed by filtration to remove any unreacted magnesium metal and impurities present in the magnesium dichloride that were insoluble in the THF. Finally, fumed silica, CAB-O-SIL™ TS-610, was added and mixing was continued until the fumed silica was dispersed, producing a spray drying feedstock. Per 100 liters of THF, 4.8 to 5 moles of Magnesium metal, 9.7 to 10.1 moles of titanium tetrachloride and 49 to 55 moles of magnesium dichloride were used to make the solution. Approximately 6.2 to 7 kilograms of the fumed silica were added to produce the spray drying feedstock. The spray drying feedstock was spray dried using a Niro Atomizer 8-foot diameter closed cycle spray dryer equipped with an FS-15 rotary atomizer using nitrogen as the drying gas. The rotary atomizer was adjusted to give catalyst particles with a D50 of 18 microns. The spray dried catalyst precursor contained approximately 2.5 weight percent Ti, 6.3 weight percent Mg, and 25 to 29 weight percent THF. The spray dried catalyst precursor particles had a D50 of 25 microns and a span [(D90-D10)÷D50] of less than 2 as determined by means of a Leeds and Northrup MICROTRAC™ particle size analyzer using a dodecane solvent. The catalyst precursor particles were mixed with mineral oil under a nitrogen atmosphere to form a slurry containing approximately 28 weight percent of the solid catalyst precursor. The catalyst precursor slurry was then fed to the polymerization reactor. Triethylaluminum was used as cocatalyst.

For Comparative Example 1, the polymerization was conducted in a dual reactor system according to example 1 of U.S. Pat. No. 7,714,072, with the exception that the catalyst precursor was not pre-contacted with aluminum alkyl prior to introduction into the reactor. The disclosure of U.S. Pat. No. 7,714,072 is incorporated herein by reference. The resulting granular resin was sieved using the sieve set described in connection with Inventive Example 1 and the key resin melt flow properties were measured. Table 16 lists the conditions of both first and second reactors and the properties of the polymers produced in each reactor.

TABLE 16

| FIRST REACTOR CONDITIONS | | SECOND REACTOR CONDITIONS | |
|---|---|---|---|
| Temperature, °C. | 85 | Temperature, °C. | 110.0 |
| $H_2/C_2$ ratio | 0.023 to 0.026 | $H_2/C_2$ ratio | 1.55 to 1.65 |
| $C_6/C_2$ ratio | 0.03 to 0.035 | $C_6/C_2$ ratio | 0.010 |
| $C_2$ partial pressure, PSI | 32 to 38 | $C_2$ partial pressure, PSI | 75 to 80 |
| Cocatalyst type | TEAL | Split | ~0.6 |
| Residence Time, hours | 2.3 to 2.4 | Residence Time, hours | 2 to 2.2 |

| FIRST REACTOR POLYMER PROPERTIES | | SECOND REACTOR POLYMER PROPERTIES | |
|---|---|---|---|
| $I_{21}$, dg/min | 0.5 | $I_{21}$, dg/min | 11 to 12 |
| Density, g/cc | 0.930 to 0.932 | $I_2$, dg/min | 0.1 to 0.12 |
| Average Particle Size (APS), inch | 0.027 to 0.030 | Density, g/cc | 0.9534 |
| Fines wt % | 4 to 5 | Bulk Density lb/ft³ | 23 to 24 |
| Bulk Density lb/ft³ | 20 to 21 | APS, inch | 0.028 to 0.030 |
| Ti ppm | 4..5 to 5 | Fines wt % | 3.5 to 4 |
| Al/Ti ratio | 35 to 40 | Al/Ti | 50 to 60 |
| | | Ti ppm | 2.8 to 3.0 |

A sample of the polymer produced in the second reactor for Comparative Example 1 was examined for polymer particle size distribution as described in connection with Inventive Example 1. The particle size distribution is shown in Table 17. Table 17 further includes flow properties for each of the fractions obtained in the sieving process.

TABLE 17

| Avg. Size µm | % In Band | Cumulative % | $I_2$, dg/min | $I_{21}$, dg/min | $I_{21}/I_2$ |
|---|---|---|---|---|---|
| 88 | 2.73 | 2.73 | 0.1540 | 28.5 | 185.1 |
| 115 | 5.38 | 8.11 | 0.1610 | 21.4 | 132.9 |
| 162 | 12.44 | 20.55 | 0.1280 | 15.8 | 123.4 |
| 229 | 4.64 | 25.19 | 0.1380 | 15.5 | 112.3 |
| 354 | 33.08 | 58.27 | 0.1190 | 13.7 | 115.1 |
| 595 | 21.82 | 80.09 | 0.0928 | 11.4 | 122.8 |
| 771 | 11.15 | 91.24 | 0.0556 | 6.89 | 123.9 |
| 917 | 4.80 | 96.04 | | 5.14 | |
| 1414 | 3.93 | 99.97 | | 3.52 | |
| 3070 | 0.03 | 100.00 | | | |
| Bulk Polymer | | | 0.1020 | 11.5 | 113 |

For Comparative Example 2, the polymerization reaction was carried out as described for Comparative Example 1 except that the reaction conditions were adjusted to increase the overall residence time in each of the reactors. Table 18 lists the conditions for both the first and second reactors for Comparative Example 2.

TABLE 18

| FIRST REACTOR CONDITIONS | | SECOND REACTOR CONDITIONS | |
|---|---|---|---|
| Temperature, °C. | 85 | Temperature, °C. | 110.0 |
| $H_2/C_2$ ratio | 0.023 to 0.026 | $H_2/C_2$ ratio | 1.6 to 1.65 |
| $C_6/C_2$ ratio | 0.03 to 0.032 | $C_6/C_2$ ratio | 0.010 |
| $C_2$ partial pressure, PSI | 40 to 42 | $C_2$ partial pressure, PSI | 70 to 75 |
| Cocatalyst type | TEAL | Split | ~0.6 |
| Residence Time, hour | 2.6 to 2.8 | Residence Time, hour | 2.8 to 3 |

TABLE 18-continued

| FIRST REACTOR POLYMER PROPERTIES | | SECOND REACTOR POLYMER PROPERTIES | |
|---|---|---|---|
| $I_{21}$, dg/min | 0.4 to 0.5 | $I_{21}$, dg/min | 11 to 12 |
| Density, g/cc | 0.930 to 0.932 | Density, g/cc | 0.946 to 0.948 |
| APS, inch | 0.025 to 0.027 | APS, inch | 0.026 to 0.028 |
| Bulk Density lb/ft³ | 20 to 21 | Bulk Density lb/ft³ | 23 to 24 |
| Fines wt % | 4 to 5 | Fines wt % | 5 to 6 |
| Al/Ti ratio | 35 to 40 | Al/Ti ratio | 50 to 60 |
| Ti ppmw | 4.5 to 5 | Ti ppmw | 2.8 to 3 |
| | | $I_2$, dg/min | 0.09 to .1 |

A sample of the polymer produced Comparative Example 2 in the second reactor was examined for polymer particle size distribution as described in connection with Inventive Example 1. The particle size distribution for Comparative Example 2 is shown in Table 19. Table 19 further includes flow properties for each of the fractions obtained in the sieving process.

TABLE 19

| Avg. Size, μm | % in Band | % Cumulative | $I_2$, dg/min | $I_{21}$, dg/min | $I_{21}/I_2$ |
|---|---|---|---|---|---|
| 88 | 2.14 | 2.14 | 0.1542 | 23.9 | 155.0 |
| 115 | 4.69 | 6.83 | 0.1432 | 14.0 | 97.8 |
| 162 | 11.54 | 18.37 | 0.1096 | 13.8 | 125.9 |
| 229 | 4.40 | 22.77 | 0.1082 | 13.1 | 121.1 |
| 354 | 31.79 | 54.56 | 0.0898 | 10.1 | 112.5 |
| 595 | 23.52 | 78.08 | 0.0564 | 8.64 | 153.2 |
| 771 | 12.18 | 90.26 | | 5.63 | |
| 917 | 5.28 | 95.54 | | 3.86 | |
| 1414 | 4.43 | 99.97 | | | |
| 3070 | 0.03 | 100.00 | | | |
| Bulk Sample | | | 0.0942 | 9.49 | 101 |

For Comparative Example 3, the polymerization reaction was as described for Comparative Example 1 except that the reaction conditions were adjusted to lower the overall residence time in each of the two reactors. Table 20 lists the conditions for both the first and second reactors for Comparative Example 3.

TABLE 20

| FIRST REACTOR CONDITIONS | | SECOND REACTOR CONDITIONS | |
|---|---|---|---|
| Temperature, ° C. | 85 | Temperature, ° C. | 110.0 |
| $H_2/C_2$ ratio | 0.023 to 0.026 | $H_2/C_2$ ratio | 1.65 to 1.75 |
| $C_6/C_2$ ratio | 0.03 to 0.035 | $C_6/C_2$ ratio | 0.002 |
| $C_2$ partial pressure, PSI | 40 to 44 | $C_2$ partial pressure, PSI | 80 to 85 |
| Cocatalyst type | TEAL | Split | ~0.6 |
| Residence Time, hr | 1.6 to 1.8 | Residence Time, hr | 1 to 1.2 |

| FIRST REACTOR POLYMER PROPERTIES | | SECOND REACTOR POLYMER PROPERTIES | |
|---|---|---|---|
| $I_{21}$, dg/min | 0.4 to 0.5 | $I_{21}$, dg/min | 11 to 12 |
| Density, g/cc | 0.928 to 0.930 | Density, g/cc | 0.946 to 0.948 |
| APS, inch | 0.025 to 0.027 | Bulk Density, lb/ft³ | 23 to 24 |
| Fines wt % | 4 to 5 | APS, inch | 0.026 to 0.028 |
| Bulk Density, lb/ft³ | 25.100 | Fines wt % | 5 to 6 |
| Ti ppmw | 3..5 to 4 | Al/Ti ratio | 50 to 60 |
| Al/TI ratio | 35 to 40 | Ti ppmw | 2.2 to 2.4 |
| | | $I_2$, dg/min | 0.09 to .1 |

A sample of the polymer produced Comparative Example 3 in the second reactor was examined for polymer particle size distribution as described in connection with Inventive Example 1. The particle size distribution for Comparative Example 3 is shown in Table 21. Table 21 further includes flow properties for each of the fractions obtained in the sieving process.

TABLE 21

| Avg. Size, μm | % in Band | % Cumulative | $I_2$, dg/min | $I_{21}$, dg/min | $I_{21}/I_2$ |
|---|---|---|---|---|---|
| 88 | 2.75 | 2.75 | 0.1196 | 25.8 | 215.7 |
| 115 | 4.81 | 7.56 | 0.1032 | 21.4 | 207.4 |
| 162 | 12.28 | 19.84 | 0.0972 | 16.0 | 164.6 |
| 229 | 4.49 | 24.33 | 0.0992 | 12.1 | 122.0 |
| 354 | 31.58 | 55.91 | 0.1088 | 12.4 | 114.0 |
| 595 | 23.31 | 79.22 | 0.0676 | 9.47 | 140.1 |
| 771 | 11.98 | 91.20 | 0.0462 | 6.26 | 135.5 |
| 917 | 4.68 | 95.88 | | 4.85 | |
| 1414 | 4.05 | 99.93 | | 3.9 | |
| 3070 | 0.07 | 100.00 | | | |
| Bulk Sample | | | 0.0948 | 10.1 | 107 |

As can be seen in Tables 19 and 21, neither of Comparative Examples 2 or 3 provided an improvement in the granular heterogeneity or in the final polymer. For each of the polymers produced in Comparative Examples 2 and 3, polymer samples were converted into pellets using an LCM-100 extruder with a 100 mesh screen pack (i.e. the melt passed through a 100 mesh screen). The pellets were then converted into inflation films and the appearance of the films judged visually based on standards that range from +50 which equates to a substantial absence of any imperfections in the film to −50 which equates to an extremely poor looking film with multiple imperfections including solid gel particles trapped within the film. All of the films had negative film ratings meaning that imperfections, gels and regions of poorly mixed polymer were readily observable to the naked eye. Commercially acceptable films have film ratings of +20 or higher, preferably at least +30.

Test Methods

Density

Resin density was measured by the Archimedes displacement method, ASTM D 792-00, Method B, in isopropanol. Specimens were measured within one hour of molding, after conditioning in the isopropanol bath at 23° C., for 8 minutes, to achieve thermal equilibrium prior to measurement. The specimens were compression molded according to ASTM D-4703-00, Annex A, with a five minutes initial heating period at about 190° C., and a 15° C./min cooling rate per Procedure C. The specimen was cooled to 45° C. in the press, with continued cooling until "cool to the touch."

Melt Flow Rate by Extrusion Plastomer

Melt flow rate measurements for the ethylene-based polymers were performed according to ASTM D-1238-04, Condition 190° C./2.16 kg, Condition 190° C./5 kg and Condition 190° C./21.6 kg, which are known as $I_2$, $I_5$ and $I_{21}$, respectively. Melt flow rate is inversely proportional to the molecular weight of the polymer. Thus, the higher the molecular weight, the lower the melt flow rate, although the relationship is not linear. Melt Flow Ratio (MFR) is the ratio of melt flow rate ($I_{21}$) to melt flow rate ($I_2$), unless otherwise specified.

Residual Metals

Titanium, aluminum and hafnium residuals were measured as ppm by wt using X-ray Diffraction techniques with appropriate standards.

Particle Size and Bulk Density

Particle size was measured using a standard set of mesh sieves—10/18/35/60/120/200/pan with openings of 2000, 1000, 500, 250, 125 and 70 microns respectively and calculated using the mass of resin retained on each sieve. Fines are defined as resin particles on the 200 mesh screen and on the pan.

The Bulk Density measurement was a poured bulk density using a standard 500 cc volumetric cylinder.

The present invention may be embodied in other forms without departing from the spirit and the essential attributes thereof, and, accordingly, reference should be made to the appended claims, rather than to the foregoing specification, as indicating the scope of the invention.

I claim:

1. A virgin granular polymer comprising polymer particles wherein at least 90% by weight of the granular polymer particles, have an $I_{21}$ that is within two standard deviations of a mean $I_{21}$ of the granular polymer, the ratio of the standard deviation of $I_{21}$ to the mean $I_{21}$ of the granular polymer is less than 0.2 and the ratio of the standard error of a linear fit to the mean of the granular polymer is less than 0.1, and further wherein the virgin granular polymer has an $I_{21}$ less than or equal to 70, and wherein particle size fractions in the range of from 125 to 2000 microns of the said virgin granular polymer have a density within +0.0022 g/cc of each other.

2. The virgin granular polymer of claim 1, wherein the granular polymer is produced in a two stage linked reactor system.

3. The virgin granular polymer of claim 1, wherein the granular polymer is produced in a one stage reactor system.

4. The virgin granular polymer of claim 1, wherein the granular polymer is produced in a fluidized bed reactor system.

5. The virgin granular polymer of claim 1, wherein the granular polymer is produced in a slurry reactor system.

6. The virgin granular polymer of claim 1, wherein the virgin granular polymer has an $I_{21}$ less than or equal to 30.

7. The reaction product of polymerizing at least one olefin monomer in the presence of: (A) at least one catalyst precursor produced by contacting a Group 4 metal compound with one or more titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, forming said catalyst precursor solution into solid particles and subsequently halogenating the solid particles; and (B) at least one co-catalyst; wherein the reaction product comprises a granular polymer comprised of polymer particles and further wherein at least 90% by weight of the granular polymer particles, have an $I_{21}$ that is within two standard deviations of a mean $I_{21}$ of the granular polymer, the ratio of the standard deviation of $I_{21}$ to the mean $I_{21}$ of the granular polymer is less than 0.2 and the ratio of the standard error of a linear fit to the mean of the granular polymer is less than 0.1, and wherein at least particle size fractions in the range of from 125 to 2000 microns of the said granular polymer have a density within +0.0022 g/cc of each other.

8. The reaction product of claim 7, wherein at least 95% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1.

9. The reaction product of claim 7, wherein at least 93% by weight of the granular polymer particles, have an $I_{21}$ that is within two standard deviations of a mean $I_{21}$ of the granular polymer, the ratio of the standard deviation of $I_{21}$ to the mean of the granular polymer is less than 0.2 and the ratio of the standard error of a linear fit to the mean of the granular polymer is less than 0.1.

10. The reaction product of polymerizing at least one monomer, in the gas phase, in the presence of: (A) at least one catalyst precursor produced by contacting a Group 4 metal compound with one or more titanium compounds selected from the group of $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution to form a catalyst precursor solution, forming said catalyst precursor solution into solid particles and subsequently halogenating the solid particles; and (B) at least one co-catalyst; wherein the reaction product comprises a granular polymer comprised of polymer particles and further wherein at least 90% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001, and wherein particle size fractions in the range of from 125 to 2000 microns of the said granular polymer have a density within +0.0022 g/cc of each other.

11. The reaction product of claim 10, wherein at least 95% by weight of the granular polymer particles, have a density that is within two standard deviations of a mean density of the granular polymer, the ratio of the standard deviation of the mean density of the granular polymer to the mean density of the granular polymer is less than 0.002 and the ratio of the standard error of a linear fit to the mean of the density is less than 0.001.

12. The reaction product of claim 10, wherein at least 93% by weight of the granular polymer particles, have an $I_{21}$ that is within two standard deviations of a mean $I_{21}$ of the granular polymer, the ratio of the standard deviation of $I_{21}$ to the mean $I_{21}$ of the granular polymer is less than 0.2 and the ratio of the standard error of a linear fit to the mean of the granular polymer is less than 0.1.

* * * * *

UNITED STATES PATENT AND TRADEMARK OFFICE
CERTIFICATE OF CORRECTION

PATENT NO. : 9,644,049 B2
APPLICATION NO. : 13/991541
DATED : May 9, 2017
INVENTOR(S) : Robert J. Jorgensen Page 1 of 1

It is certified that error appears in the above-identified patent and that said Letters Patent is hereby corrected as shown below:

In the Claims

Column 22, Claim 7, Line 2:
"0.1, and wherein at least particle size fractions in the range"
Should read:
--0.1, and wherein particle size fractions in the range--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*